United States Patent [19]

Föhl

[11] Patent Number: 5,340,152
[45] Date of Patent: Aug. 23, 1994

[54] SAFETY BELT RESTRAINING SYSTEM WITH BELT TENSIONER

[75] Inventor: Artur Föhl, Schorndorf, Fed. Rep. of Germany

[73] Assignee: TRW Repa GmbH, Alfdorf, Fed. Rep. of Germany

[21] Appl. No.: 93,403

[22] Filed: Jul. 19, 1993

[30] Foreign Application Priority Data

Jul. 28, 1992 [DE] Fed. Rep. of Germany ....... 4224924

[51] Int. Cl.$^5$ ................. B60R 22/28; B60R 22/46
[52] U.S. Cl. ................................. 280/805; 180/274; 297/472; 188/371; 280/808
[58] Field of Search ............... 280/805, 806, 807, 808; 180/274, 268, 269; 297/472, 471, 480, 479; 188/371, 374; 60/638, 636, 632

[56] References Cited

U.S. PATENT DOCUMENTS

| | | | |
|---|---|---|---|
| 4,152,025 | 5/1979 | Bendler et al. | 297/386 |
| 4,258,934 | 3/1981 | Tsuge et al. | 280/806 |
| 4,422,669 | 12/1983 | Chiba et al. | 280/806 |
| 4,795,189 | 1/1989 | Vollmer et al. | 180/274 X |
| 5,076,608 | 12/1991 | Shimose | 280/801 |
| 5,127,671 | 7/1992 | Yano et al. | 280/806 |
| 5,174,409 | 12/1992 | Osawa | 280/806 X |

FOREIGN PATENT DOCUMENTS

| | | | |
|---|---|---|---|
| 0540921 | 5/1993 | European Pat. Off. | 280/806 |
| 2411702 | 9/1975 | Fed. Rep. of Germany | 280/805 |
| 3307093 | 9/1983 | Fed. Rep. of Germany. | |
| 4020600 | 1/1991 | Fed. Rep. of Germany. | |
| 4106480 | 9/1992 | Fed. Rep. of Germany. | |

*Primary Examiner*—Brian L. Johnson
*Assistant Examiner*—Peter English
*Attorney, Agent, or Firm*—Tarolli, Sundheim & Covell

[57] ABSTRACT

A belt tensioner for a safety belt system having a belt retractor (10) featuring an automatic blocking mechanism, the belt (14) running in a straight line from the belt retractor to a deflector fitting (12), comprises a U-shaped deflector fitting (18) mounting a pivotal bracket (22) perpendicular to the run of the belt in the rest condition. When the belt tensioner is activated the pivotal bracket (22) is pulled through between the base of a deflector fitting (18) and a supporting member (20) secured thereto to form a belt loop. An uncoupling-/force limiter assembly (36) is arranged in the path of the cable (34, 38) connected to the pivotal bracket. This assembly comprises a guide tube (50) supported by the vehicle body and a converter tube (52) accommodated therein telescopically which is shiftable up to a stop at the base of the guide tube (50) and which permits force limitation and conversion of energy due to plastic material deformation when the belt is tensioned.

8 Claims, 3 Drawing Sheets

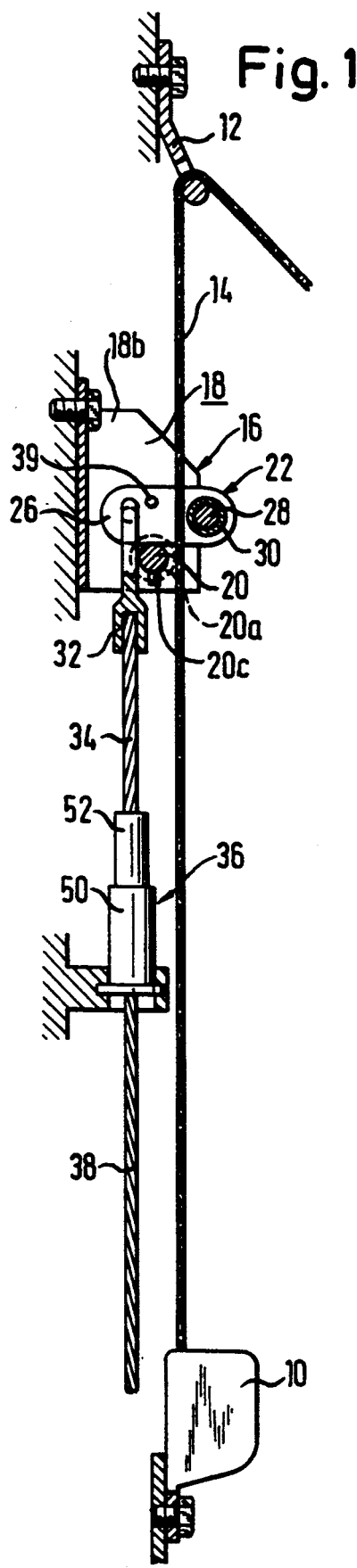
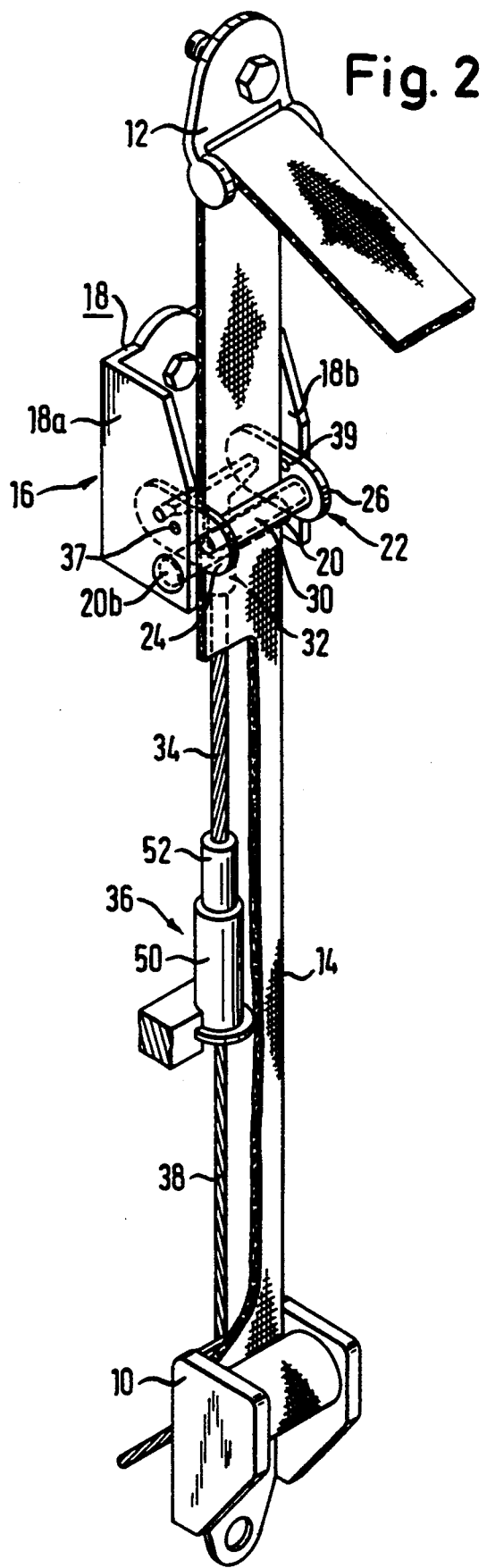

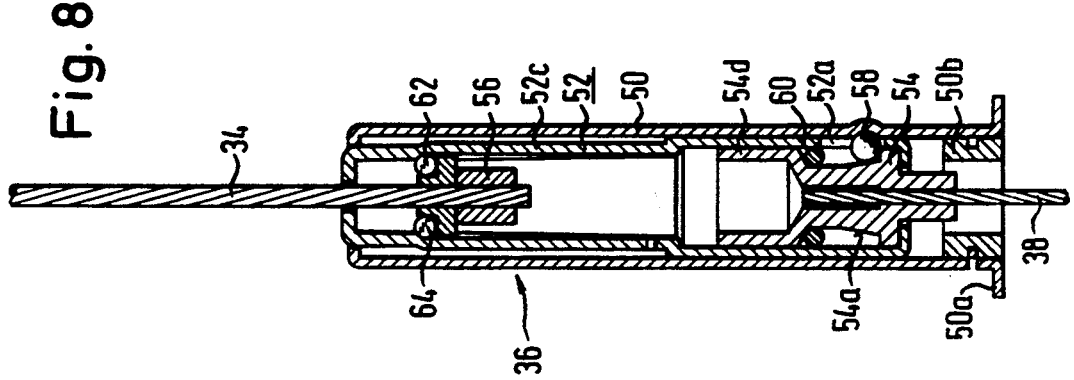
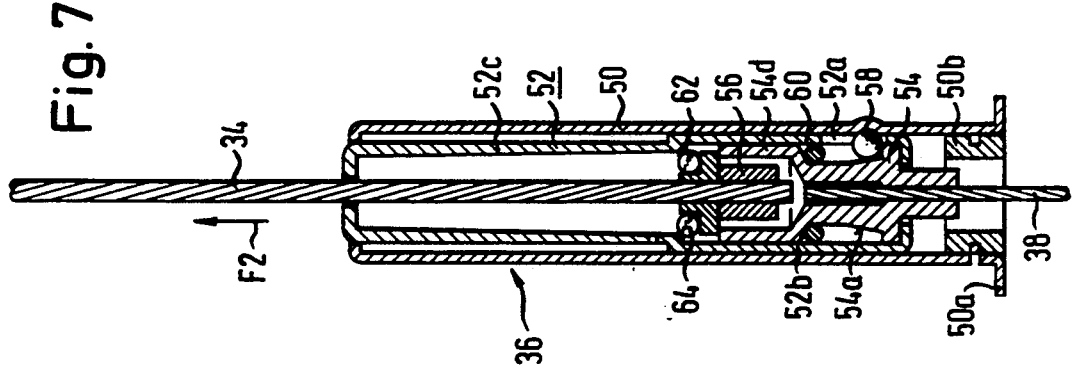
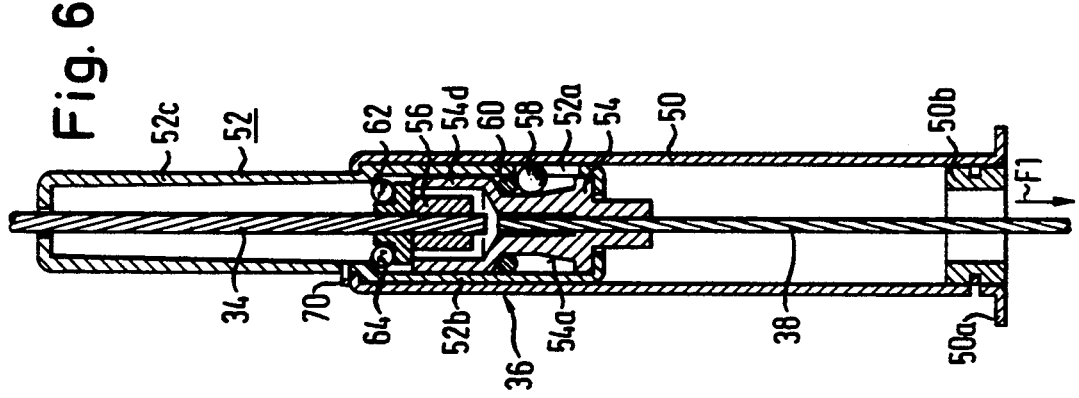

SAFETY BELT RESTRAINING SYSTEM WITH BELT TENSIONER

The invention relates to a vehicle safety belt restraining system with a belt tensioner which by means of an engaging member engages the belt to shorten its effective length and the drive of which is derived from the shift of a vehicle member relative to the vehicle body under impact conditions.

A safety belt restraining system of this kind is known for example from U.S. Pat. No. 4,423,846. Under hard vehicle impact conditions a deformation of the vehicle body occurs in the forward area accompanied by a shift of the engine/transmission assembly relative to the vehicle body. From this relative displacement the necessary linear drive for belt tensioning can be derived by means of a cable.

Various designs of belt tensioners are known which engage the belt by means of an engaging member to pull out the belt release from the belt system in forming a loop. One example is the belt tensioner described in DE 30 44 951 A1 in which the drive is produced by a pyrotechnical piston/cylinder unit.

When the drive for the belt tensioner is to be derived from the member of the vehicle receiving a displacement relative to the vehicle body in the case of vehicle impact, it must be ensured that the forces engaging the belt are not too high. Limiting this force can, for example, be achieved by a design breakpoint in the cable used to transmit the movement of the vehicle member to the engaging member which in turn engages the belt. Dimensioning such a design breakpoint is, however, critical.

In sophisticated vehicle safety belt restraining systems the aim is to deplete the surge loads resulting in the belt by energy conversion. One such energy conversion system can be achieved by force limiting means located in the force flow of the belt and featuring parts which can be shifted relative to each other so that a plastic material deformation occurs in their relative displacement under load. One such force limiter suitable for this purpose is described, for example, in U.S. Pat. No. 5,069,482, it being suitable for incorporating between the belt lock and an anchoring attachment on the vehicle body.

When using a belt tensioner of the aforementioned type, including such a force limiter in the force flow between the vehicle member and the engaging member is not feasible since the forward displacement of the vehicle occupant and the thereby wanted energy displacement will not occur until the displacement of the vehicle member relative to the vehicle body may have already attained such a degree that decoupling of the cable from the engaging member must have already taken place beforehand.

By means of the invention a vehicle safety belt restraining system is created which, without critical dimensioning of design breakpoints in the tensioning means, ensures reliable decoupling of the engaging member from the vehicle member following belt tensioning over a precisely defined distance so that the possibility is also made available to arrange a force converter to deplete surge loads in the belt system by utilizing the tensioning means.

This is achieved in a safety belt restraining system of the aforementioned kind by including in the flow of the force between the vehicle member and the engaging member decoupling means comprising two coupling members coupled together positively and permitting displacement relative to each other under load in the sense of a distance from each other, of which the first is connected at the belt end via a first section of the tensioning means to the engaging member and the second section of the tensioning means is connected at the drive end to the vehicle member, by the second coupling member being assigned a guiding means which is supported on the vehicle body and is provided with a stop to limit the displacement of the second coupling member during belt tensioning and by a reverse stroke inhibiting means being provided between the guide means and the second coupling member to counteract any return movement of the second coupling member away from the stop. When, for instance, on vehicle impact the engine/transmission assembly is displaced relative to the vehicle body, this relative movement is transmitted by tensioning means, particularly by a cable, to the second coupling member which then moves towards the stop on the guiding means, this stop being attained when vehicle impact is heavy. Further displacement of the second coupling member is prevented by the stop supported by the vehicle body. When an overload situation occurs the cable breaks at the second coupling member, it then remaining, however, displaced in the vicinity of the stop due to the reverse stroke inhibiting means becoming active. As a result the belt system is decoupled from the vehicle member after a precisely determined displacement travel of the second coupling member.

By one advantageous embodiment of the invention use is made of this property to arrange a force limiter between the second coupling member and the tension means section secured to the first coupling member, a change in energy resulting in the force limiter due to plastic material deformation. For this purpose the first coupling member has the form of a piston slidably accommodated within the second tubular-shaped coupling member and the positive drive between the first and second coupling member is produced by rollers supported radially inwards by the piston to engage the inside of the wall of the second tubular-shaped coupling member and, in a loading situation, to penetrate therein when plastic material deformation occurs. The decoupling means thus forms together with the force limiter a compact, slim assembly which can be accommodated in the vehicle without any particular difficulty. All parts of this assembly can be produced at low cost in series production since neither the materials nor the manufacturing tolerances are subject to especially high requirements.

By a further advantageous embodiment of the invention the belt tensioner features at the freely moving end of the belt and slightly spaced away therefrom a supporting member, and at the other end of the belt, again slightly spaced away therefrom, the engaging member is provided. When the belt tensioner is activated the engaging member is moved against the belt, the latter against the supporting member and finally the engaging member is moved past the supporting member by a loop being formed in the belt parallel to the run of the belt, The engaging member is held between the first ends of two parallel arms of a pivotal bracket which in the rest condition of the belt tensioner is supported by the edges of arms maintained transversely to the belt at the supporting member. The first section of the tensioning means is connected to the second ends of the arms of the pivotal bracket. One such belt tensioner necessitates little space to be accommodated in the vehicle and engages the belt gently so as not to damage it.

Further features and advantages of the invention will be evident from the following description and the drawing to which reference is made and in which FIG. 1 is a partially sectioned, schematic side view of a belt tensioner integrated in an existing safety belt system;

FIG. 2 is a perspective view of the arrangement shown in FIG. 1;

FIGS. 6, 7 and 8 are longitudinal sections of a decoupling/force limiting assembly provided in the system, shown following belt tensioning and in the course of energy conversion resulting during force limiting.

Figure 3:
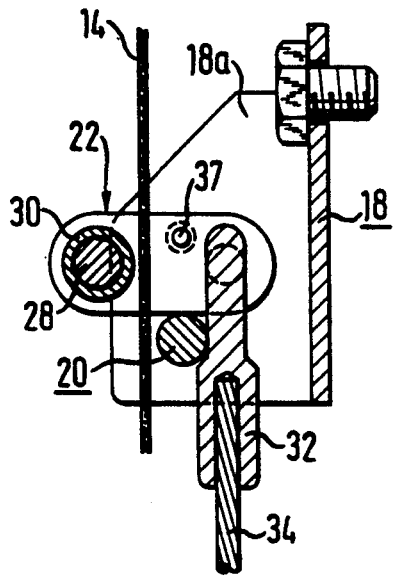
FIG. 3 is a section view of the actual belt tensioner in its rest condition.

In a conventional safety belt system a belt retractor 10 is secured to the center column of a vehicle near to the vehicle floor. Via the belt retractor a deflector fitting 12 is secured to the center column of the vehicle more or less level with the head of the occupant. Between the belt retractor 10 and the deflector fitting 12 a belt section 14 extends in a straight line , a belt tensioner generally identified by 16 connecting this belt section 14.

The belt tensioner 16 comprises a U-shaped fitting 18 which is also secured to the center column of the vehicle. The two sidewalls 18a, 18b of the fitting 18 are connected together by a supporting member 20 which, as can be seen from FIG. 1, is formed by a rigid pin having at one end a flange 20a to locate the outside of sidewall 18b of the fitting 18 and is securely riveted to the sidewall 18a at its opposite end, identified by 20b. The supporting member 20 is held non-turnable in the fitting 18 by a nose 20c engaging a suitable recess in the sidewall 18b of the fitting 18.

On the fitting 18 a pivotal bracket 22 is held in an rest condition as shown in FIGS. 1, 2 and 3. This pivotal bracket comprises two parallel arms 24, 26 spaced away from each other which are connected together at their first end by a rigid spindle 28 on which a roller 30 is mounted free to turn. This roller 30 forms the engaging member which engages the belt tensioner on the belt. Between the other ends of the arms 24, 26 a tee-shaped stay 32 is swivably mounted. To this stay 32 a first cable section 34 is secured. The pivotal bracket 22 is held by the shear pins 37, 39 shown in their rest condition in FIGS. 1 thru 3 which, on the one hand, are located by holes in alignment with each other in the sidewalls 18a, 18b of the fitting 18 and the arms 24, 26 of the pivotal bracket 22, on the other. In this rest condition the arms 24, 26 of the pivotal bracket 22 are arranged transversely to the running direction of the belt section 14. The pivotal bracket 22 is supported by the edges of the arms 24, 26 on the supporting member 20. This supporting member is located on one side of the belt section 14 at a slight distance away therefrom, and the roller 30 is located at a distance away from the opposite end of the belt section 14. The belt is thus guided without obstruction between the supporting member 20 and the roller 30 as well as between the arms 24, 26 of the pivotal bracket 22.

Section 34 of the cable leads to a decoupler/force limiter assembly 36 which will be described in more detail later with reference to FIGS. 6, 7 and 8. From here a second section 38 of the cable leads to a vehicle member which during vehicle impact receives displacement relative to the vehicle body, more particular the engine and transmission assembly.

Figure 4:
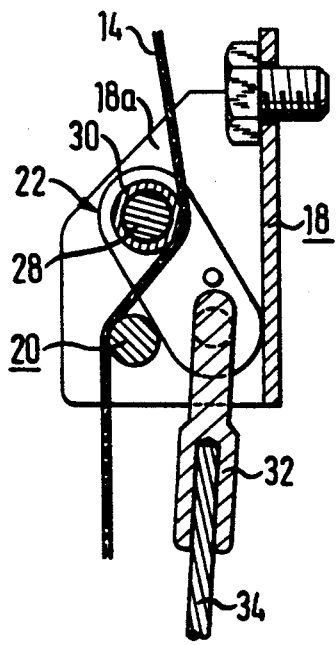
FIG. 4 is a side view corresponding to FIG. 3 showing the condition shortly before activation of the belt tensioner.
Figure 5:
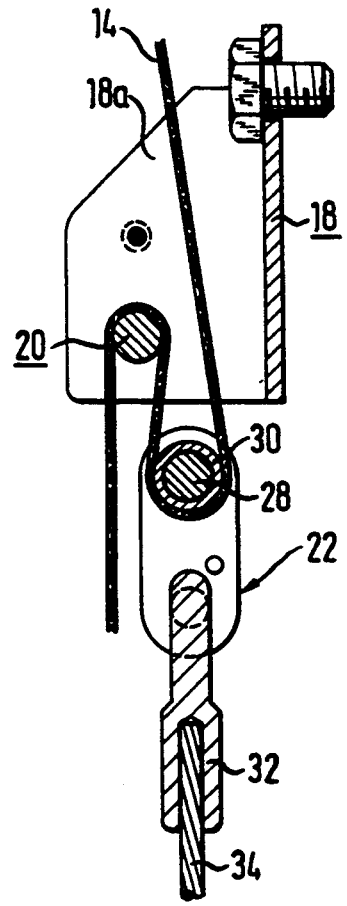
FIG. 5 is a view corresponding to FIGS. 1 and 2 showing the belt tensioner in the course of forming a belt loop.

When the belt tensioner is activated, tension is exerted via the cable section 34 and the stay 32 on the pivotal bracket 22, which first shears the shear pins 37, 39. The pivotal bracket 22 supported by the supporting member 20 is then first swivelled, causing the roller 30 to be first displaced in the direction of the deflector fitting 12 until it comes into contact with the belt section 14. Further swivelling of the pivotal bracket 22 causes it to slide over the surface of the supporting member 20, causing the belt to be first guided against the surface of the supporting member 20 due to the roller 30 before being gradually deflected around the supporting member 20. At the same time the pivotal bracket 22 slides over the surface of the supporting member 20 as shown in FIG. 4 , the ends of the arms 24, 26 in the vicinity of the stay 32 impinging against the base of the fitting 18 and guided therein. The pivotal bracket 22 is then pulled through between the supporting member 20 and the base of the fitting 18 causing a loop to be formed in the belt section 14. This condition is shown in FIG. 5. The belt loop is increased by further downwards movement of the pivotal bracket 22 with the stay 32 until the tension exerted via the cable 34 is terminated.

Prior to the belt tensioner being activated the belt retractor 10 is locked by its blocking mechanism which is sensitive to movements of both vehicle and belt. As a result the belt section leading from the deflection fitting 12 to the vehicle occupant is shortened during belt looping.

The decoupling/force limiter assembly 36 shown in FIGS. 6, 7 and 8 will now be described in more detail.

This assembly 36 comprises a guide tube 50 having at its lower end a flange 50a for support on the vehicle body, a converter tube 52 accommodated telescopically shiftable in the guide tube 50 and two coupling members 54, 56 of which the first coupling member 56 at the belt tensioning end is connected to the cable section 34 and the other coupling member 54 at the drive end is connected to the cable section 38. In the end of the guide tube 50 having flange 50a a bush 50b is incorporated which serves as a stop for movement of the converter tube 52 within the guide tube 50. The coupling member 56 forms a piston as a press fit on the end of the cable section 34. This piston may also be formed one-member in a deviation from how it is shown in the drawing. The coupling member 54 is secured to the base of the converter tube 52 and features a tapered ramp surface 54a to support the locking balls 58. These locking balls 58a protrude through windowlike openings 52a in the wall of the converter tube 52 to come into contact with the inside of the guide tube 50. By means of a ring 60 of rubber-elastic material the locking balls 58 are preloaded to engage with the inside of the guide tube 50. The inclination of the ramp surface 54a is selected so that unobstructed movement of the converter tube 52 is possible in the direction of the bush 50b serving as the stop; in the opposite direction the locking balls 58 are effective since they are pressed by the ramp surfaces 54a against the wall of the guide tube 50, deforming it under high load and thus blocking the converter tube 52 at the guide tube 50. This condition is shown in FIG. 7.

The converter tube 52 has a first section 52b, the outer diameter of which is adapted to the internal diameter of the guide tube 50, and a second section 52c of lesser diameter which together with the inside of the guide tube 50 forms an annular gap. Between the two sections 52b, 52c a step is formed on the inside of the converter tube 52. In the positions shown in FIGS. 6 and 7 the coupling member 56 is located between this step and the coupling member 54. The coupling member 54 is provided with a generally pot-shaped continuation which is formed by an apron 54d. The outer edge of this apron 54d serves the coupling member 56 as a stop to define its rest condition as shown in FIG. 6. In this condition the member of the coupling member 56, as a press fit on the cable section 34, protrudes into the interior space of the apron 54d. At its end facing away from the coupling member 54 the coupling member 56 has two recesses diametrally opposed to each other in each of which a roller 62 and 64 respectively is accommodated. The outer circumference of the rollers 62, 64 protrudes from the inner diameter of the section 52c of the converter tube 52.

When—on the basis of the rest condition as shown in FIG. 6—tension is exerted in the direction of the arrow F1 on the cable section 38 the converter tube 52 moves in the guide tube 50 in the direction of the bush 50b acting as a stop. In this movement the step between the sections 52b, 52c of the converter tube 52 encounters the rollers 62, 64 so that via these rollers the coupling member 56 is included in the movement. Via the cable section 34 the belt tensioner shown in FIGS. 1 and 2 is activated. Should a medium to heavy vehicle impact occur the converter tube 52 is displaced until it comes up against the bush 50b. When vehicle impact is particularly heavy the cable section 38 can separate from the coupling member 54. In any case the converter tube 52 is arrested in its displaced position relative to the guide tube 50 by the locking balls 58. Following belt tensioning the condition as shown in FIG. 7 occurs. In this condition a tensile force results in the cable section 34 in the direction of the arrow F2 due to the forward displacement of the vehicle occupant. Under the effect of this tensile force F2 the locking balls 58 are first forced into engagement with the wall of the guide tube 50. When the force F2 attains a critical threshold value, as of which force limiting is desired, the rollers 62, 64 overcome the step between the sections 52b, 52c of the converter tube 52 and penetrate the wall of section 52c. The material of section 52c is then plastically deformed, resulting in the wanted conversion of energy. The coupling member 56 forming a piston is then displaced within the converter tube 52 in the direction of the arrow F2 as shown in FIG. 8. The free end of the converter tube 52 is closed off by a radially inwards directed collar forming a stop for the coupling member 56.

As is evident from the drawing, section 52c of the converter tube 52 has a wall cross-section which progressively increases in the direction towards the free end to achieve a corresponding increase in the level of the limiting force.

In the rest condition shown in FIG. 6 the converter tube 52 can be defined at the guide tube 50 by a separatable member 70.

The described decoupling/force limiter assembly 36 thus provides reliable decoupling of the belt tensioner from the cable section 38 or the vehicle member connected thereto so that excessive forces are reliably kept away from the belt system. For the desired force limiting and energy conversion there is always a sufficient length of section 52c available at the converter tube 52 since the converter effect does not occur until belt tensioning is completed. Assembly 36 is compact, comprises merely a few components and places no high demands on the manufacturing tolerances. This assembly too is easy to integrate in existing safety belt systems.

What is claimed is:

1. A vehicle safety belt restraining system with a belt tensioner device, comprising:
    an engagement member forming part of said belt tensioner device;
    a first cable section having one end connected to said engagement member;
    a second cable section connected to a vehicle member which under impact conditions moves relative to a vehicle body portion;
    and a coupling device interconnecting said first and second cable sections;
    said coupling device comprising a first coupling member connected to said first cable section and a second coupling member connected to said second cable section,
    said first and second coupling members being connected with each other by connecting means which yield under load to permit a limited movement of said first and second coupling members away from each other,
    said second coupling member being guided in a guiding member supported on a vehicle body part,
    and said guiding member having a stop to limit movement of said second coupling member under tensile load in said second cable section.

2. The safety belt system of claim 1, wherein said guiding mean comprises a guide tube in which said second coupling member is slidably accommodated.

3. The safety belt system of claim 2, wherein said guiding member is provided with reverse stroke inhibiting means which permit movement of said second coupling member in a direction towards said stop and block movement of said second coupling member in a direction away from said stop.

4. The safety belt system according to claim 3, wherein said reverse stroke inhibiting means comprises roller locking members.

5. The safety belt system according to claim 3, wherein said connecting means comprises a tube member, said second coupling member having a bevel surface portion and being accommodated in said tube member in a manner to be telescopically shiftable in said guide tube, at least one roller locking member being supported radially inwardly on said bevel surface portion and engaging an inner wall portion of said guide tube through an opening in said tube member.

6. The safety belt system according to claim 5, wherein said first coupling member is formed by a piston slidably accommodated within said tube member, said piston carrying at least one coupling roller member engaged between said piston and an inner wall portion of said tube member, and said coupling roller member penetrating into said wall portion under heavy tensile load in said first cable section.

7. The safety belt system of claim 5, wherein said second coupling member comprises a piston arranged at a bottom portion of said tube member and an integral sleeve which has an annular abutment face to define a rest position of said first coupling member, said first coupling member partly extending into a cylindrical space defined by said sleeve.

8. The safety belt system according claim 1, comprising a belt retractor and a belt deflection fitting, and said belt tensioner device comprising:

a frame for attachment to a vehicle bodywork portion and having a pair of parallel side walls interconnected by a base and a deflection member mounted between said side walls, and a bracket having a pair of parallel legs spaced from each other, a rod interconnecting said legs at a first end thereof, and said engagement member being connected to a second end of each leg, wherein said legs have an intermediate edge portion bearing on said deflection member and a section of belt webbing extends in a plane between said retractor and said deflection fitting, and extends freely through an opening defined between said legs, said rod and said deflection member, and said bracket, upon tensile load occurring in said first cable section, moving around said deflection member, towards and along said base, engaging said webbing section and forming a loop of belt webbing by pulling said webbing against, around and past said deflection member to reduce the effective length of belt webbing.

* * * * *

UNITED STATES PATENT AND TRADEMARK OFFICE
CERTIFICATE OF CORRECTION

PATENT NO. : 5,340,152
DATED : August 23, 1994
INVENTOR(S) : Artur Fohl

It is certified that error appears in the above-indentified patent and that said Letters Patent is hereby corrected as shown below:

Column 6, line 41, change "mean" to --member--.

Signed and Sealed this

Fourteenth Day of February, 1995

Attest:

BRUCE LEHMAN

Attesting Officer     Commissioner of Patents and Trademarks